United States Patent
McCandless et al.

(10) Patent No.: US 9,996,529 B2
(45) Date of Patent: *Jun. 12, 2018

(54) METHOD AND SYSTEM FOR GENERATING DYNAMIC THEMES FOR SOCIAL DATA

(71) Applicant: ORACLE INTERNATIONAL CORPORATION, Redwood Shores, CA (US)

(72) Inventors: Timothy P. McCandless, Boulder, CO (US); Mehrshad Setayesh, Lafayette, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 566 days.

This patent is subject to a terminal disclaimer.

(21) Appl. No.: 14/555,075

(22) Filed: Nov. 26, 2014

(65) Prior Publication Data

US 2015/0149448 A1    May 28, 2015

Related U.S. Application Data

(60) Provisional application No. 61/909,076, filed on Nov. 26, 2013.

(51) Int. Cl.
*G06F 17/30* (2006.01)
*G06F 17/27* (2006.01)
*G06Q 50/00* (2012.01)

(52) U.S. Cl.
CPC ......... *G06F 17/2785* (2013.01); *G06Q 50/01* (2013.01)

(58) Field of Classification Search
CPC ......... G06F 17/30705; G06F 17/30675; G06F 17/30648; G06F 17/2785; G06Q 50/01
See application file for complete search history.

(56) References Cited

U.S. PATENT DOCUMENTS

| | | | | |
|---|---|---|---|---|
| 6,006,221 | A | * | 12/1999 | Liddy ............... G06F 17/30011 |
| 6,411,962 | B1 | * | 6/2002 | Kupiec ............. G06F 17/30616 |
| 7,383,172 | B1 | | 6/2008 | Jamieson |
| 8,090,724 | B1 | | 1/2012 | Welch |
| 8,200,761 | B1 | | 6/2012 | Tevanian |
| 8,245,135 | B2 | | 8/2012 | Cai |
| 8,255,572 | B1 | | 8/2012 | Coomer |
| 8,438,124 | B2 | | 5/2013 | Spivack |
| 8,630,975 | B1 | | 1/2014 | Guo |
| 8,676,565 | B2 | | 3/2014 | Larcheveque |
| 8,694,304 | B2 | | 4/2014 | Larcheveque |
| 8,738,721 | B1 | | 5/2014 | Smirnov |
| 8,788,524 | B1 | * | 7/2014 | Wolfram ............. G06F 17/3064 707/737 |

(Continued)

OTHER PUBLICATIONS

Notice of Allowance and Fee(s) Due dated Oct. 12, 2016 for related U.S. Appl. No. 14/527,697.

(Continued)

*Primary Examiner* — Shiow-Jy Fan
(74) *Attorney, Agent, or Firm* — Vista IP Law Group, LLP

(57) ABSTRACT

Disclosed is a system, method, and computer program product for performing dynamic theme analysis with regards to social data. A user interface is provided that allows the user to view and interact with to view and control the process/mechanism for performing theme analysis.

33 Claims, 12 Drawing Sheets

(56) References Cited

U.S. PATENT DOCUMENTS

| | | | |
|---|---|---|---|
| 8,849,812 B1* | 9/2014 | Mukherjee | G06F 17/30867 707/728 |
| 8,886,623 B2* | 11/2014 | Garg | G06F 17/30705 707/706 |
| 9,075,870 B2* | 7/2015 | Lee | G06F 17/30705 |
| 9,276,974 B2 | 3/2016 | Sommer | |
| 9,336,192 B1 | 5/2016 | Barba | |
| 9,378,202 B2 | 6/2016 | Larcheveque | |
| 9,442,930 B2* | 9/2016 | Szucs | G06F 17/30737 |
| 9,727,925 B2 | 8/2017 | Subramanian | |
| 2002/0116174 A1 | 8/2002 | Lee | |
| 2003/0009526 A1 | 1/2003 | Bellegarda | |
| 2003/0061200 A1 | 3/2003 | Hubert | |
| 2003/0154072 A1 | 8/2003 | Young | |
| 2004/0162827 A1 | 8/2004 | Nakano | |
| 2004/0199498 A1* | 10/2004 | Kapur | G06F 17/30672 |
| 2004/0205448 A1 | 10/2004 | Grefenstette | |
| 2004/0225667 A1 | 11/2004 | Hu | |
| 2005/0108001 A1 | 5/2005 | Aarskog | |
| 2007/0016580 A1* | 1/2007 | Mann | G06F 17/30011 |
| 2007/0067157 A1 | 3/2007 | Kaku | |
| 2008/0133488 A1 | 6/2008 | Bandaru | |
| 2008/0140644 A1* | 6/2008 | Franks | G06F 17/30817 |
| 2008/0204595 A1* | 8/2008 | Rathod | G06F 17/30796 348/465 |
| 2009/0013052 A1 | 1/2009 | Robarts | |
| 2009/0112892 A1 | 4/2009 | Cardie | |
| 2009/0177484 A1 | 7/2009 | Davis | |
| 2010/0125540 A1 | 5/2010 | Stefik | |
| 2010/0205128 A1* | 8/2010 | Nolan | G06F 17/30702 706/13 |
| 2010/0280985 A1 | 11/2010 | Duchon | |
| 2010/0312769 A1 | 12/2010 | Bailey | |
| 2011/0153595 A1 | 6/2011 | Bernstein | |
| 2011/0196670 A1 | 8/2011 | Dang | |
| 2011/0219107 A1 | 9/2011 | Betros | |
| 2011/0252045 A1* | 10/2011 | Garg | G06F 17/30705 707/750 |
| 2012/0089621 A1 | 4/2012 | Liu | |
| 2012/0131139 A1 | 5/2012 | Siripurapu | |
| 2012/0303559 A1 | 11/2012 | Dolan | |
| 2013/0041962 A1 | 2/2013 | Wang | |
| 2013/0081056 A1 | 3/2013 | Hu | |
| 2013/0086072 A1 | 4/2013 | Peng | |
| 2013/0090918 A1* | 4/2013 | Lee | G06F 17/30705 704/9 |
| 2013/0132384 A1* | 5/2013 | Bohm | G06F 17/30283 707/736 |
| 2013/0238785 A1 | 9/2013 | Hawk | |
| 2013/0262442 A1 | 10/2013 | Dennis | |
| 2014/0074551 A1 | 3/2014 | Setayesh et al. | |
| 2014/0215443 A1 | 7/2014 | Voccio | |
| 2014/0337308 A1* | 11/2014 | De Francisci Morales | G06F 17/3089 707/708 |
| 2015/0089409 A1 | 3/2015 | Asseily | |
| 2015/0120302 A1 | 4/2015 | Mccandless et al. | |
| 2015/0149463 A1 | 5/2015 | Mccandless et al. | |
| 2016/0034445 A1 | 2/2016 | Setayesh et al. | |
| 2016/0034560 A1 | 2/2016 | Setayesh et al. | |
| 2016/0034571 A1 | 2/2016 | Setayesh et al. | |
| 2016/0092551 A1 | 3/2016 | Tang et al. | |

OTHER PUBLICATIONS

Non-final Office Action dated Dec. 3, 2015 for related U.S. Appl. No. 14/527,697.

Final Office Action dated May 20, 2016 for related U.S. Appl. No. 14/527,697.

Non-final Office Action dated Apr. 20, 2017 for related U.S. Appl. No. 14/555,042.

Non-final Office Action dated Apr. 21, 2017 for related U.S. Appl. No. 14/815,692.

Final Office Action dated Aug. 29, 2017 for related U.S. Appl. No. 14/555,042.

Non-final Office Action dated Sep. 19, 2017 for related U.S. Appl. No. 14/815,714.

Non-final Office Action dated Nov. 16, 2017 for related U.S. Appl. No. 14/863,690.

Notice of Allowance and Fee(s) Due dated Feb. 9, 2018 for related U.S. Appl. No. 14/555,042.

Notice of Allowance and Fee(s) Due dated Feb. 8, 2018 for related U.S. Appl. No. 14/815,714.

Notice of Allowance and Fee(s) Due dated May 9, 2018 for related U.S. Appl. No. 14/815,714.

Notice of Allowance and Fee(s) Due dated Apr. 20, 2018 for related U.S. Appl. No. 14/863,690.

* cited by examiner

METHOD AND SYSTEM FOR GENERATING DYNAMIC THEMES FOR SOCIAL DATA

CROSS-REFERENCE TO RELATED APPLICATIONS

The present application claims the benefit of priority to U.S. Provisional Application Ser. No. 61/909,076, filed on Nov. 26, 2013, entitled, "METHOD AND SYSTEM FOR GENERATING DYNAMIC THEMES FOR SOCIAL DATA", which is hereby incorporated by reference in its entirety. The present application is related to U.S. application Ser. No. 14/555,042, filed on even date herewith, entitled, "METHOD AND SYSTEM FOR PERFORMING TOPIC CREATION FOR SOCIAL DATA", which is hereby incorporated by reference in its entirety.

BACKGROUND AND SUMMARY

Given the widespread availability and usage of the internet by consumers, many businesses have become interested in being able to effectively monitor the content and commentary provided by such consumers. Interactive websites such as social networks and blogs provide a wealth of useful information that can be advantageously used by a business.

It is possible to monitor the content of social media sites to identify the ranges of topics that are being commented about by users on the sites. By knowing about and understanding these topics, many businesses can then act upon that information to increase sales and revenue. It would be very desirable to allow the businesses to stay informed of actionable social networking content, for example, to identify potential customers and possible sales leads or to identify problematic situations that may require immediate involvement of customer service personnel.

For example, consider a CRM (Customer Relationship Management) application, which is designed to facilitate the ability of a business to create, develop, and build relationships with its customers or potential customers. It would be very desirable to allow the business CRM application to stay informed of actionable social networking content, for example, to identify potential customers and possible sales leads.

As another example, brand managers are often interested in monitoring commentary on the internet regarding their brands or competitors' brands. Brand managers may read the commentary to gauge interest in their marketing materials, receive feedback regarding their products, or take further action regarding any postings that warrant some type of follow-up response.

Embodiments of the present invention provide a system, method, and computer program product for allowing an entity to access social media data, and to perform dynamic theme analysis upon that data. The invention is capable of accessing data across multiple types of internet-based sources of social data and commentary. A user interface is provided that allows the user to view and interact with data and control the process/mechanism for dynamic theming.

Other additional objects, features, and advantages of the invention are described in the detailed description, figures, and claims.

DETAILED DESCRIPTION

The present disclosure is directed to an approach for performing semantic analysis upon social data. This type of analysis can be used to more accurately and comprehensively understand the significance of data retrieved and reviewed from various sources.

Consider if it is desired to perform analysis upon data from one or more social media sites to identify topics within that data. The analysis may be performed for any suitable purpose. For example, consider the situation where a marketer wishes to identify social media content pertaining to a given subject matter. Given the wide range of terms, terminology and word usage choices by users of social media systems, it is often very difficult for conventional technologies to automate the process of identifying the subject matter that is actually being addressed by any given social media message or posting.

Embodiments of the present invention address this problem by providing a system, method, and computer program product for allowing an entity to access the social media data, and to perform dynamic theme analysis upon that data. The invention is capable of accessing data across multiple types of internet-based sources of social data and commentary to perform the theme analysis. A user interface is provided that allows the user to view and interact with data and control the process/mechanism for dynamic theming.

Topic Creation

In some embodiments, dynamic theming can be implemented using a set of data that is presented as a result of creating and/or identifying a topic within the social data. This section of the disclosure will now describe one possible approach that can be taken to perform topic creation, which provides an approach to capture the scope of a given set of subject matter. The topic definitions can then be used, for example, to automatically and dynamically identify themes within various search results from those identified topics.

Figure 1:
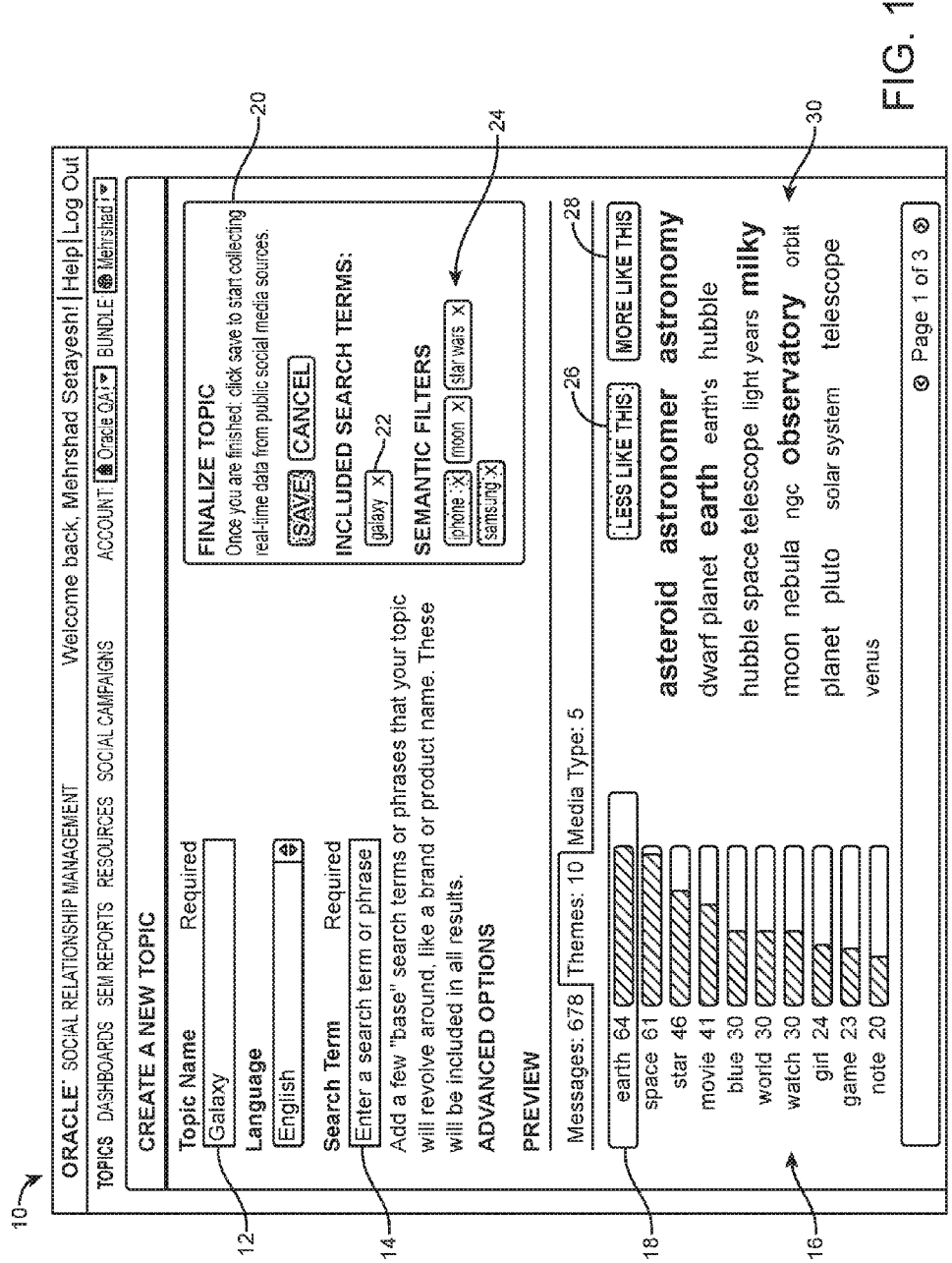
FIG. 1 shows an example interface for performing topic creation.

FIG. 1 illustrates an example interface 10 for performing topic creation according to some embodiments of the invention. Field 12 is a portion of interface 10 that allows the user to provide an identifier for a new topic.

Search criteria can be provided through interface 10 to perform a search of content from one or more sources. For example, field 14 permits the user to provide one or more search terms that can be as part of the search for a matching set of results from within a database of social data. The data may comprise a selected amount of data from over a given time period, e.g., containing a rolling window having three months of collected data/messages from one or more social media sources.

Based at least in part upon performing semantic analysis, themes are identified within the social data using the search term from field 14, to identify the central or pertinent idea of some or all of an item of content that is analyzed. Themes can be identified, for example, by performing semantic analysis and identifying semantic clusters within the analyzed data. The semantic clusters correspond to themes within the social media data. For example, latent semantic analysis (LSA), an advanced form of statistical language modeling, can be used to perform semantic analysis upon the content. This permits the system to understand the contextual and semantic significance of terms that appear within the social data. For example semantic analysis can be used to understand the difference between the term "Galaxy" used in the astronomy content and the same term "Galaxy" that is used to refer to the name of a professional soccer team, and to them determine whether these terms correspond to the theme for an item of content.

Portion 16 of the interface 10 provides a listing of the themes identified from within the social data that pertain to the search term. Each of the identified themes has a theme identifier, along with a numerical value identifying the number of messages/items that pertain to the search term. The listing of the themes can be presented as a sorted list, where the themes having the largest number of messages/items are placed at the top of the list.

The interface permits a user to select a theme to review additional information about that theme. For example, portion 18 shows a highlighted theme, where selection of this theme by the user (e.g., by having the user move a mouse interface over these theme) causes portion 30 to display additional content/information/terms from messages/items that correspond to that theme. The user can review that displayed information to determine if that identified theme is really of interest to the user.

To explain, consider if themes are identified when the search term is "Galaxy". Assume that semantic analysis is performed such that multiple themes are identified pertaining to that search term. In particular, a first possible theme may pertain to the term "Galaxy" used in the astronomy content, a second possible theme may pertain to a professional soccer team, and a third possible theme may pertain to a popular model of a mobile telephone.

In this example, each of these themes would be identified in a list in portion 16 of the interface 10. Furthermore, each of these themes can be reviewed by selecting a given theme (e.g., as shown with the highlighting of portion 18). Once selected, portion 30 would display a sample of the terms/contexts associated with that theme. With the information displayed in portion 30, the user can decide which of the identified themes, if any, correspond to a topic of interest to the user.

Selection buttons 26 and 28 are provided to allow a user to indicate which of the themes are or are not pertinent to a topic of interest. Button 28 (e.g., a "More Like This" button) is used to identify a theme that is identifiable as pertinent to the topic of interest. In contrast, button 26 (e.g., a "Less Like This" button) is used to identify a theme that is identifiable as not being pertinent to the topic of interest.

Selection of button 28 will create a semantic filter that constrains the search process to identify and display themes that more correspond to the selected "More Like This" theme. On the other hand, selection of button 26 will create a semantic filter that constrains the search process to eliminate from the search results any themes that correspond to the selected "Less Like This" theme. Application of a new semantic filter will cause a new search result to be produced and displayed in portion 16 of the interface.

Each time the user makes a new "More Like This" or "Less Like This" selection, the topic definition for the new topic is adjusted accordingly to include a new corresponding semantic filter. Interface portion 20 displays the current state of the topic definition parameters for the new topic. Interface sub-portion 22 identifies the search term(s) for the new topic. Interface sub-portion 24 identifies the semantic filters that have been created for the topic.

The user may undergo multiple iterations of the process to view search results, where the search results are adjusted by selecting one or more themes for which a semantic filter is to be created. After some period of time, the application of the appropriate semantic filters should provide an acceptable definition of a new topic which addresses the subject matter of interest to the user, while filtering out subject matter that do not pertain to the subject matter of interest. This can be accomplished, for example, when the combination of the selected filters causes all and/or most of the themes identified in interface portion 16 to generally correspond to the subject matter of interest. At that point, the topic definition can be saved to create the new topic.

Figure 2:
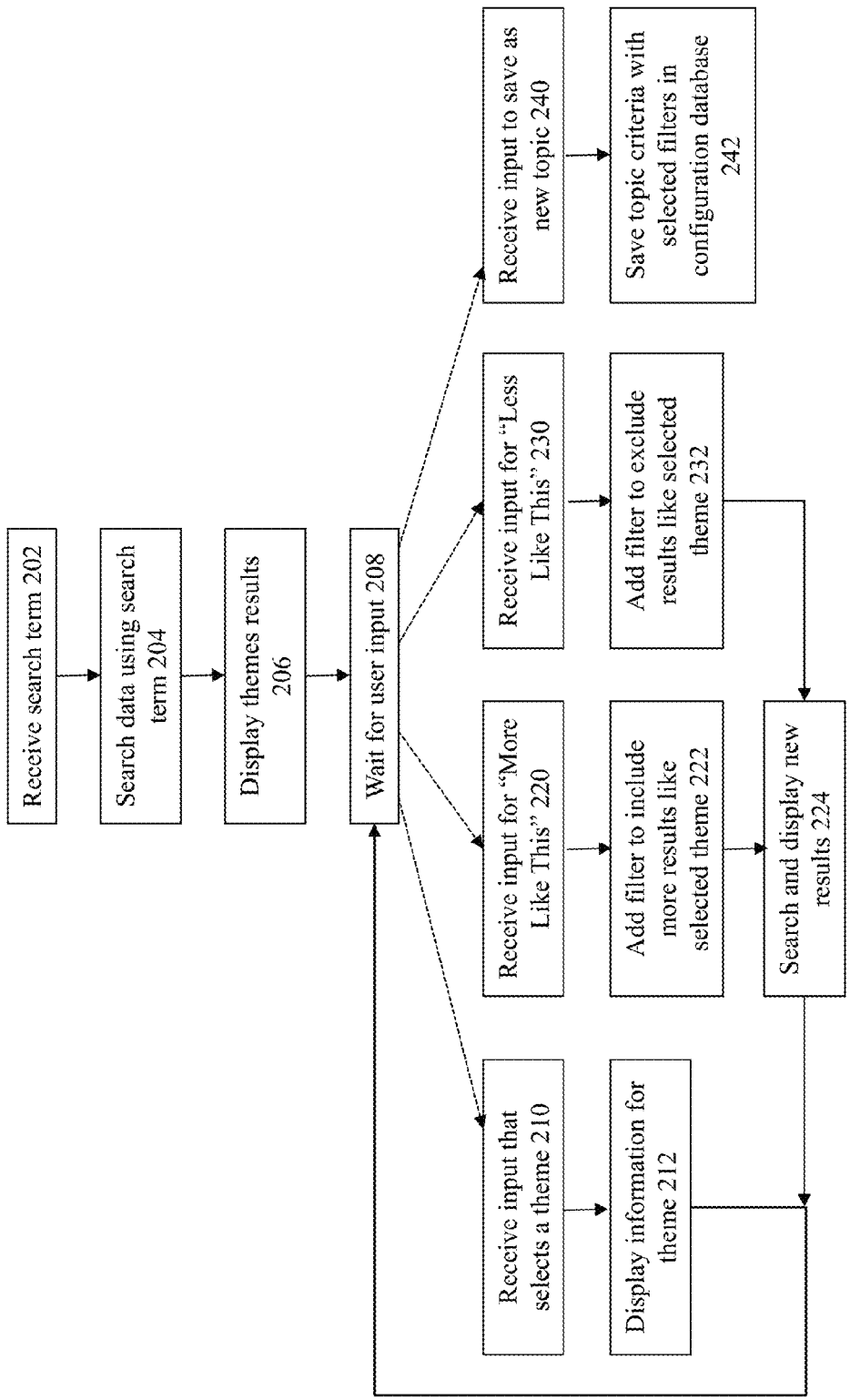
FIG. 2 shows a flowchart of an approach to perform topic creation according to some embodiments of the invention.

FIG. 2 shows a flowchart of a process to create a new topic using a user interface, e.g., as shown in FIG. 1. A two stage process is performed, whereby a first stage includes a keyword search using a search term. The second stage is performed by using semantic analysis upon the search results. The second stage can therefore be used to disambiguate the search terms/keywords from the search results, e.g., for themes that are not of interest to the user.

At 202, one or more search terms are received from the user. At 204, the collected social data is searched using the search term. In one embodiment, an exact keyword match is performed at 204. Alternatively, variants of the search term can be applied to generate search results.

At 206, semantic analysis is performed to identify a set of themes to the user. In some embodiments, latent semantic analysis is performed to identify the themes. A sorted listing of the themes is presented to the user in the user interface. Controls are also provided to the user to permit selection of one or more themes to establish a new semantic filter for the topic. Such control include, for example, the pertinent interface elements shown in FIG. 1 to select "More Like This" and "Less Like This" themes, which cause corresponding semantic filters to be created for the selected themes.

At 208, the interface waits for new user inputs. For example, at 210, the user interface may receive an input that selects a given theme from the listing of themes in the search results. This causes, at 212, a portion of the interface to display additional information about the selected theme. The displayed information about the selected theme should provide enough context for the user to determine whether the identified theme either does or does not pertain to the subject matter of interest to the user.

If the identified theme is of particular relevance to the subject of interest to the user, then at 220, the user can provide an input to the interface that makes this known to the system. This results, at 222, in the addition of a new semantic filter to the current definition parameters for the new topic. In addition, at 224, the new semantic filter will cause a new search to be performed over the data, with the updated search results presented to the user in the user interface.

On the other hand, if the identified theme is deemed to be of very little relevance to the subject of interest to the user, then at 230, the user can provide an input to the interface that makes this known to the system. At 232, this results in the addition of a new semantic filter, which constrains the search results to not include content pertaining to the selected theme. At 224, the new semantic filter will cause a new search to be performed over the data, with the updated search results presented to the user in the user interface.

The user may undergo multiple iterations of the above steps to add (and/or remove) the semantic filters, where application of the semantic filters should provide a listing of themes shown in the user interface to generally correspond to the subject matter of interest to the user.

Once the user is satisfied with the current definition of the new topic, then at 240, the user may provide an input to the user interface to save the new topic. The topic parameters (e.g., search term(s) and semantic filter(s)) should include an acceptable definition of a new topic which addresses the subject matter of interest to the user, while filtering out subject matter that does not pertain to the subject matter of interest. At that point, at 242, the topic definition can be saved in a configuration database to create the new topic.

Figure 3:
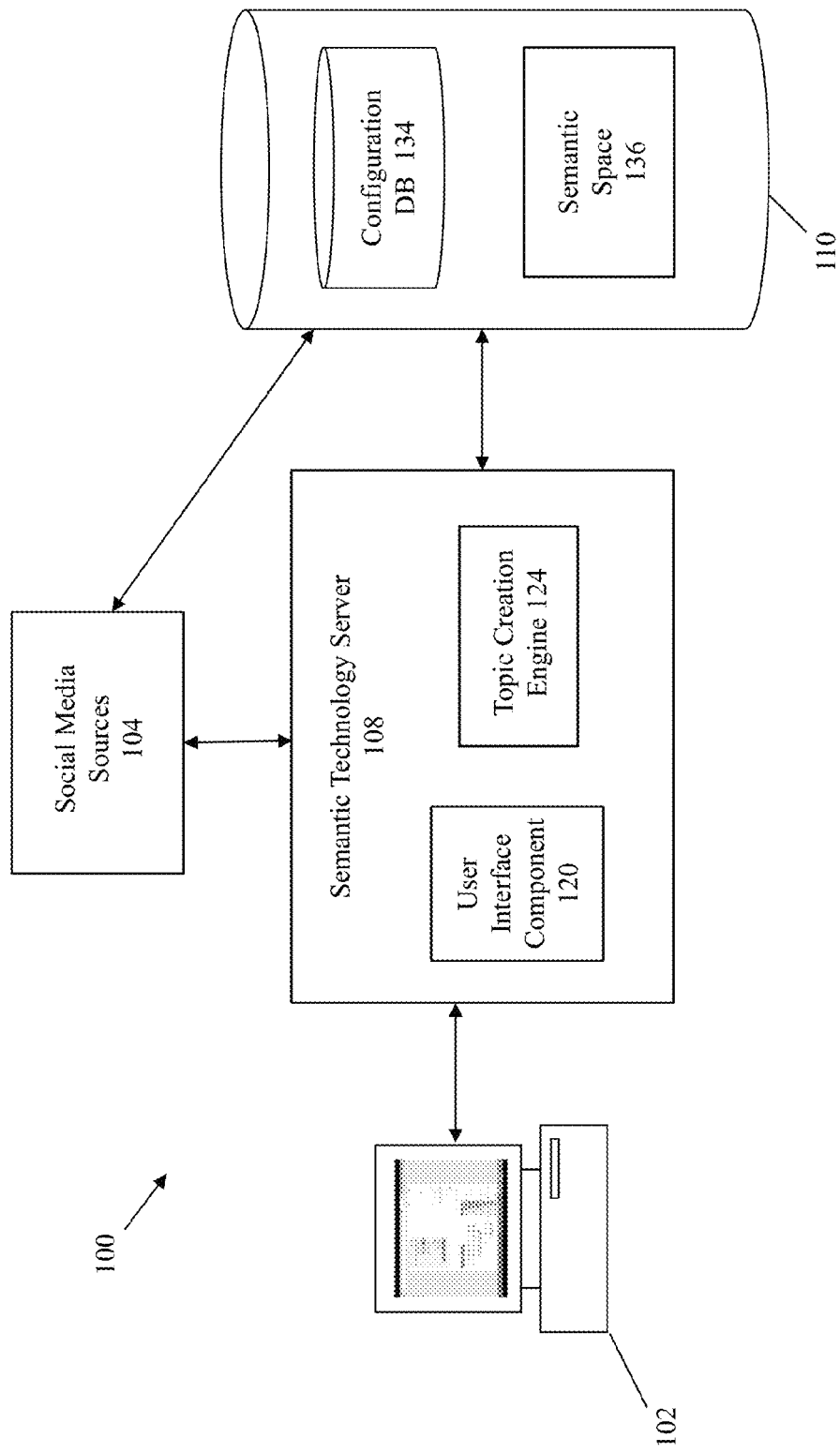
FIG. 3 illustrates a system to implement topic creation.

FIG. 3 illustrates an example system 100 which may be employed in some embodiments of the invention to implement topic creation. The system includes one or more users at one or more user stations 102 that operate the system. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs. The semantic technology server 108 may include a user interface mechanism to generate a user interface that is displayed to the user on a display device. The user interface may be embodied, for example, as the interface shown in FIG. 1.

A semantic technology server 108 receives data from one or more online social data sources 104. Such social data sources 104 include, for example, websites such as a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types. It is noted that while the currently described embodiment describes analysis of social data, the inventive concepts are applicable to analysis of other types of content as well.

Semantic analysis is performed upon the social media data by the semantic technology server 108. The semantic technology server 108 may be implemented as a standalone semantic analysis tool, or can be included as a component within another tool, e.g., a social relationship management tool.

In some embodiments, the semantic technology server 108 comprises a topic creation engine 124 to create topics with respect to the social media data. The topic creation engine 124 processes the social data using semantic analysis to identify themes within the data. The identified themes are used to create definition parameters for a new topic, e.g., by adding semantic filters that pertain to the identified themes. In operation, the topic creation engine 124 may access a semantic space 136 to perform the themes analysis, as described in more detail below. The topics definitions created using the topic creation engine 124 may be stored in a configuration database 134.

A user interface component 120 generates the content that is visually displayed to a user at user station 102. This content includes, for example, the interface elements shown in FIG. 1. The user interface component 120 may also be used to retrieve user inputs through the user interface to control the operations of the topic creation engine 124.

The configuration database 134*m*, semantic space 136, and/or analysis results can be stored in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Figure 4:
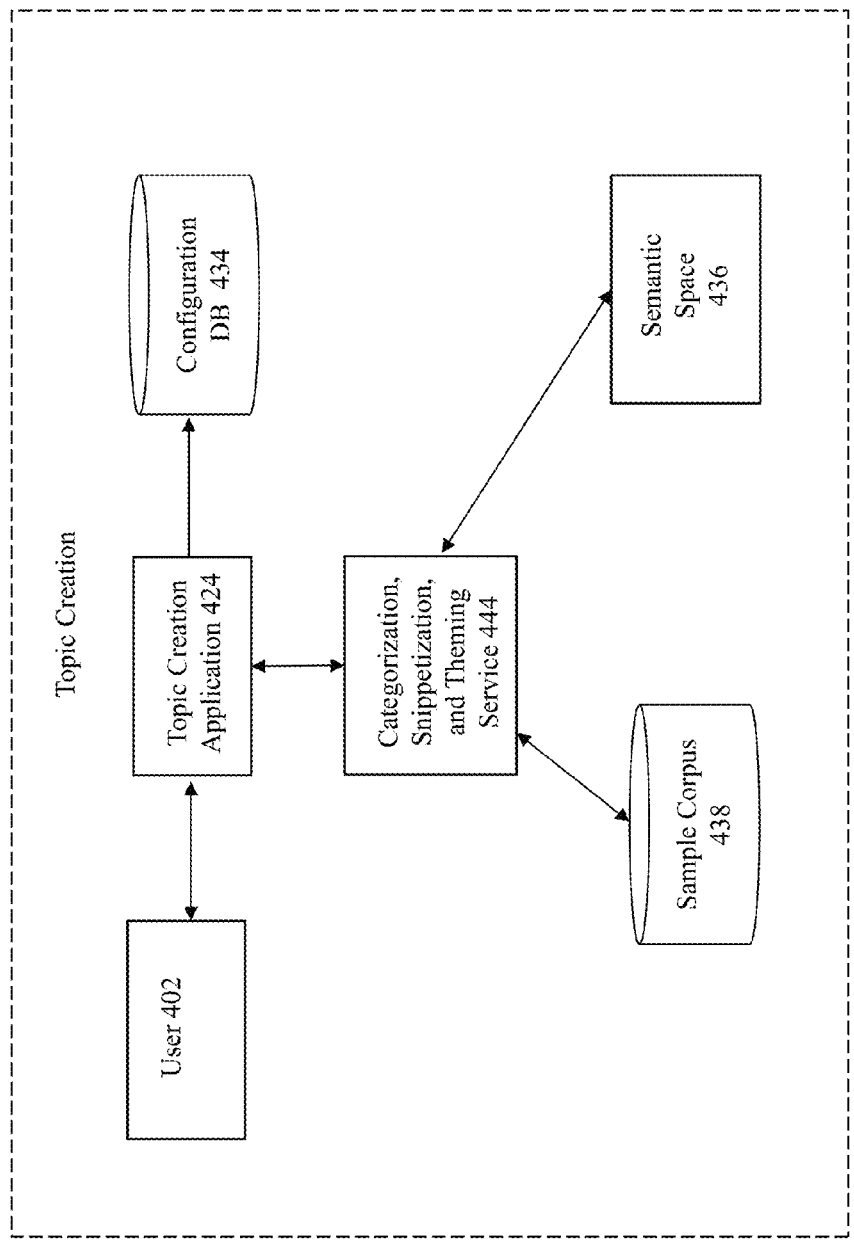
FIG. 4 illustrates a topic creation mechanism and flow according to embodiments of the invention.

FIG. 4 illustrates an example architecture that can be used to perform topic creation according to some embodiments of the invention. A topic creation mechanism/application 424 is used by a user 402 to create the new topic. The topic creation mechanism/application comprises any combination of hardware/software that is configured and/or programmed to perform the actions specified herein. New topics created by the topic creation mechanism/application 424 can be stored into a configuration database 434.

The topic creation mechanisms/application 424 interfaces with a categorization, snippetization, and theming service 444. The service 444 provides functionality to perform categorization of a given set of content using semantic analysis. The analysis may be provided over the full content of a data item, or may instead be applied to a "snippet" from the data comprising a more targeted subset of the data. Theme identification of the data may also be performed by service 444. While these functions are described in conjunction with a single service 444 in the figure, it is noted that any number and/or combination of one or more components/services may be utilized in practice to accomplish the described functions.

The service 444 may access a sample corpus 438 to perform its functions. The sample corpus comprises a collected set of data from which the desired analysis is to be performed. In some embodiments, the sample corpus 438 comprises a rolling three month window of data collected from one or more social network sites.

A semantic space 436 is accessed to perform semantic analysis upon data from the sample corpus 438. The semantic space 436 comprises a collection of vector values for a number of dimensions that are identifiable for terms within the social data to be analyzed. These vector values are usable to understand the actual meaning of terms when used in different contexts. Mathematical computation and comparison of the term vectors allows one to determine the underlying meaning of various themes and documents.

Figure 5:
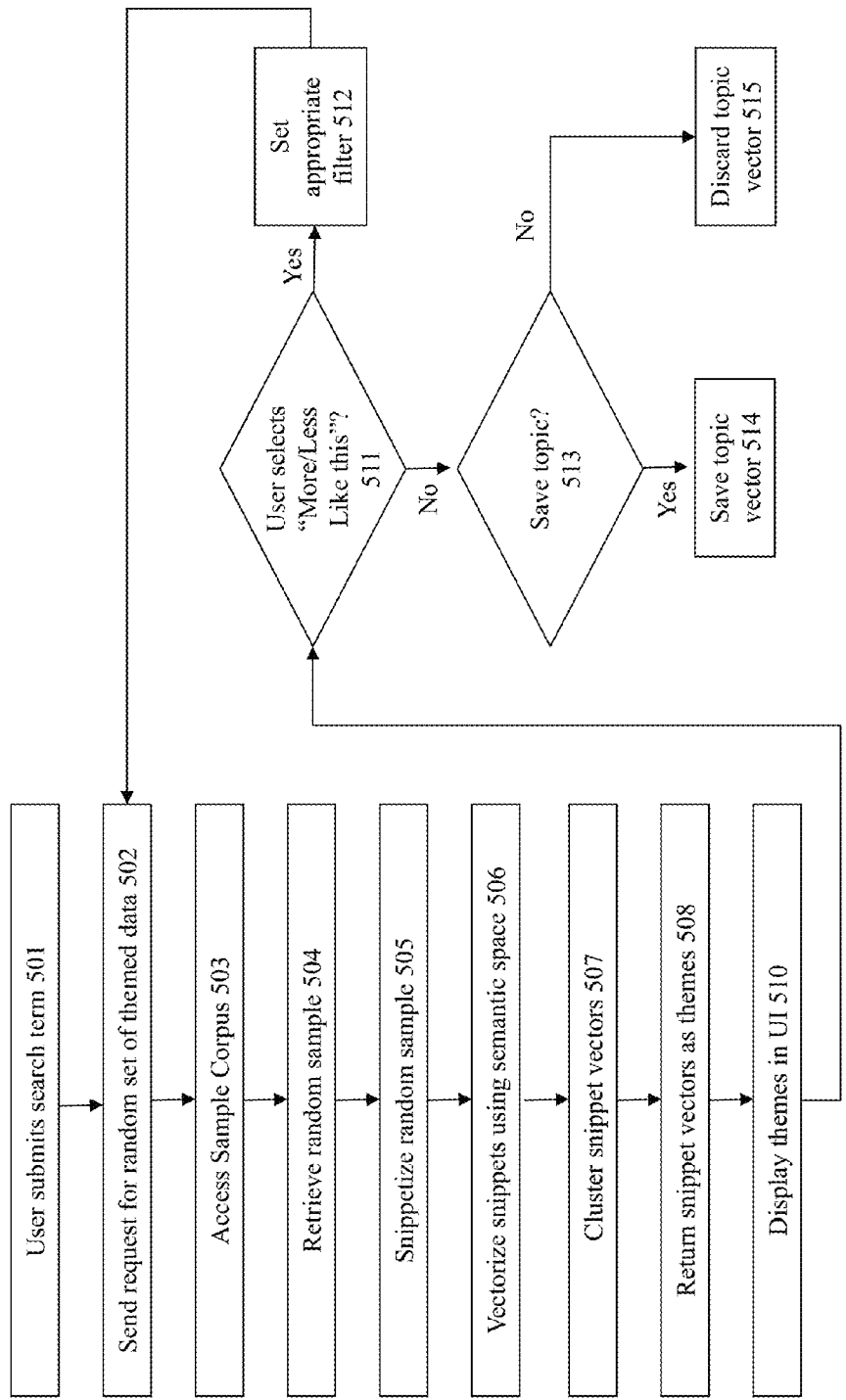
FIG. 5 shows a detailed flowchart of an approach to perform topic creation according to some embodiments of the invention.

FIG. 5 shows a flowchart describing how the architecture of FIG. 4 is usable to perform topic creation. At 501, the user submits an initial search term from the user interface to the topic creation mechanism/application 424.

Next, at 502, the topic creation mechanism/application 424 sends a request for a random set of themed messages to the service 444. The request is for a random set of the data. The general idea is that, instead of performing analysis upon the entirety of the data, the analysis can be performed for a selected sampling of the data. Assuming that the samples are properly extracted from the underlying content with adequate randomness, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

At 503, the service 444 accesses the sample corpus 438 to obtain a random selection of messages using the initial search term. The selection may be performed by using the search term to perform a keyword/Boolean query against the data within the sample corpus 438.

At 504, a random sample of messages is returned to the service 444. Next, at 505, the random sample of messages is snippetized into "snippets". The snippet may not be the entirety of the message content. Instead, the snippet may only contain a given number of words on either side of the occurrence of the word/topic of interest within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries (e.g., the beginning or end of a sentence/paragraph) to adjust the cut-off point for a snippet.

One reason for using snippets instead of the entire message content is because this approach may provide a much more accurate assessment of the meaning/context or a document. For example, consider if the search term is the term "galaxy", where only a very small portion of the message actually pertains to that term. If a snippet is identified which is centered around that term, and only that snippet of the message is semantically analyzed, then it is likely that the semantic analysis will produce a relatively accurate semantic understanding for how that term is used in the message. On the other hand, if the entirety of the message is semantically analyzed instead, and the vast majority of the message is focused on a different subject matter from that term "galaxy", then it is possible that the semantic meaning of how the term is used may be obscured by the overwhelming weight of the rest of the message which has no pertinence to that term.

At 506, the snippets that correspond to the random sample of messages are vectorized using the semantic space 436. The semantic vectors are created across a number of dimensions for the term vectors (e.g., across 300 dimensions). The vectorization is performed for all of the words within the snippets. In other words, a vector is obtained for each word in the snippet. The vectors for a given snippet are averaged together to obtain a single, overall vector for the snippet. This provides a mathematical value for the context/meaning of that snippet.

At 507, snippets are clustered together, where vector comparisons are performed so that snippets having similar vectors are clustered together. Clustering may be performed, for example, by using the KMeans++ approach to clustering.

A given cluster of vectors corresponds to a single theme. Therefore, at 508, the clustered snippets are returned as themes. At 510, the themes are displayed to the user in a user interface. The user interface includes interface elements to permit the user to select one or more of the themes to create semantic filters.

At 511, a determination is made whether the user has selected any of the themes for a new semantic filter. For example, a determination is made whether the user has selected a "More Like This" or "Less Like This" button for a given theme. If so, then at 512, a new semantic filter is created. The actions starting from 502 are repeated to obtain a new set of search results that takes account of the new semantic filter.

At 513, a determination if made whether the desires to save the new topic. If not, then the topic vector is discarded at 515. If so, then the topic vector is saved at 514. In one embodiment, the average value of the vectors of the selected themes provides the vector value for a topic vector that is saved for the new topic. This topic vector is then saved into the configuration database 434.

As noted above, multiple iterations of the steps to configure the semantic filters may be needed to arrive at an acceptable definition for creating a topic. The topic parameters (e.g., search term(s) and semantic filter(s)) should have been configured to include an acceptable definition of a new topic which addresses the subject matter of interest to the user, while filtering out subject matter that does not pertain to the subject matter of interest.

The issue that may be faced is that a user may not necessarily know when enough semantic filters have been added to adequately configure the scope of the new topic. Without knowing when to stop, the user may end up with either too many or too few semantic filters, both of which are problematic. In the situation of too few semantic filters, the created topic may inadvertently include too much content that is irrelevant to the subject matter of interest to the user. In the situation of too many semantic filters, the application of excessive filters may cause the processing system to incur a greater cost in terms of time and computing resources to perform its processing, and may end up with search results that excessively cull away highly material content that the user would otherwise wish to include within the topic.

To address this issue, some embodiments of the invention make use of a volatility index to determine when enough semantic filters have been added to the definition of a new topic. The volatility index provides a measure to quantify how much commonality and/or difference exists between the themes that are provided in the search/analysis results in response to the search terms and the semantic filters.

Figure 6:
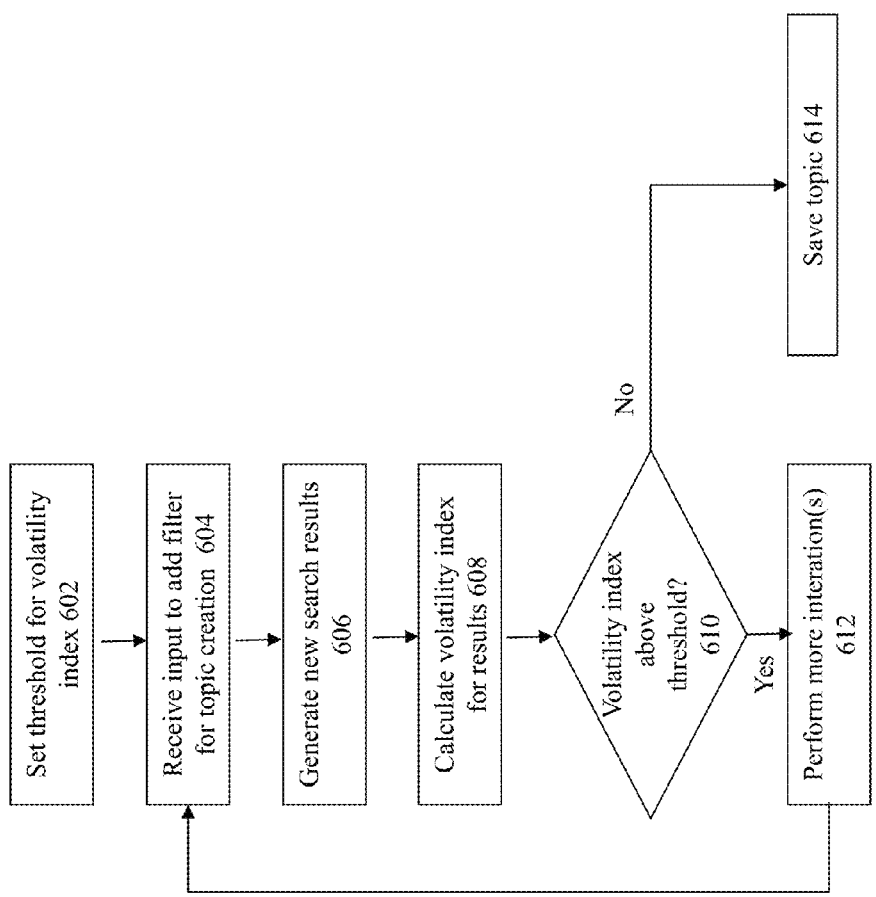
FIG. 6 shows a flowchart of an approach to use a volatility index according to some embodiments of the invention.

FIG. 6 shows a flowchart of an approach to use a volatility index according to some embodiments of the invention. At 602, a threshold is set for the volatility index, where the threshold indicates an acceptable degree/level of volatility for the topic.

At 604, input is received to add a semantic filter for topic creation. The semantic filter may be either a positive filter or a negative filter, corresponding to a "More Like This" filter to include additional similar themes or a "Less Like This" filter to prevent the inclusion of certain similar themes. At 606, new search results are generated in response to the new semantic filter. The new search results include a new set of displayed themes to the user.

At 608, a volatility index is generated for the search results. To perform this action, a centroid (center of mass) is computed for the vector values for the content that is associated with each theme. If snippetization is employed, then the centroid would be calculated for the set of snippets that correspond to a given theme. The centroid values for the collection of themes that are produced from performing a search are analyzed to determine how close the collected centroids for the various themes are to one another. Greater levels of variances (e.g., larger distances) between the centroids correspond to a higher volatility index value, whereas lowers levels of variances (e.g., smaller distances) between the centroids corresponds to a lower volatility index value.

At 610, a determination is made whether the volatility index is at or above the threshold. If the volatility index value is above the threshold, then from 612, the process returns back to 604 add one or more additional semantic filters.

At the beginning of the iterative process, it is likely that there will be numerous themes that differ quite a bit from one another, causing the volatility index to indicate a high degree of volatility. However, as the user iteratively add new semantic filters, it is likely that the volatility index value will over time indicate a smaller degree of volatility.

Once the volatility index falls below the designated threshold, then the user should have confidence that the topic has been configured to include enough semantic filters to provide an acceptable scope of definition for the topic, which captures the subject matter of interest to the user while filtering out subject matter that do not pertain to the subject matter of interest. The topic can thereafter be saved at 614.

The volatility index can be used in numerous ways. One possible approach is to provide an interface that visually displays the volatility index to the user. With this approach, the user can visually detect the moment when the topic definition has reached an acceptable volatility level. The interface can be configured such that the user manually saves the topic when an acceptable volatility level is reached. In an alternative approach, the process is automated such that the topic is automatically saved once an acceptable volatility threshold has been reached. The approach therefore automatically controls creation of a new topic based at least in part upon a threshold value established for the volatility index.

Figure 7:
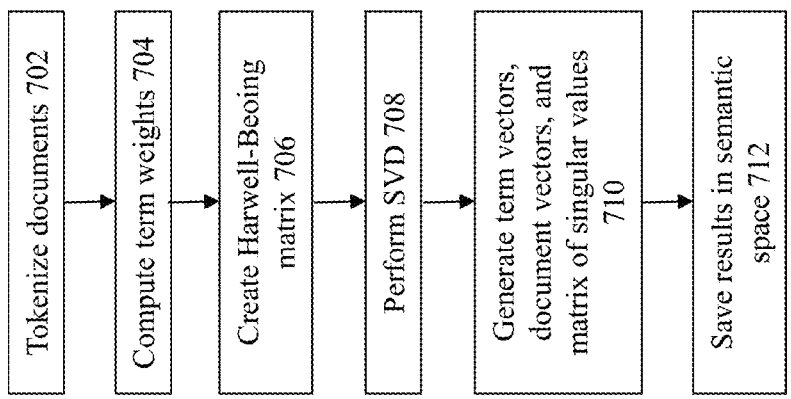
FIG. 7 shows a flowchart of an approach to create a semantic space according to some embodiments of the invention.

FIG. 7 shows a flowchart of an approach to create a semantic space according to some embodiments of the invention. The general idea is that a learning model is implemented to represent terms as high-dimensional vectors within the semantic space. Singular value decomposition (SVD) is employed to reduce a matrix of terms into a set of multidimensional vectors.

At 702, incoming documents are tokenized. This action is performed in some embodiments by (a) normalizing punctuations, (b) identifying co-locations; and (c) removing stop words. Stop words to be removed include, for example, "and", "or", "the", "to", "be", "is", "at".

At 704, term weights are computed for the tokenized content. A global frequency is computed for the terms. In addition, a global weight (e.g., entropy) is computed for the terms. The terms can also be sorted at this stage.

At 706, a matrix of the terms is created. The matrix can be formed with content passages as rows and words as columns, where cells contain the number of times that a given word is used in a given passage. The cell values are transformed into a measure of the information about the passage identity the carry. The matrix can be formed as a Harwell-Beoing matrix.

In some embodiments, the matrix is formed using the following process:
For each document d
  For each term t
    Create a Cell value using the global weight;

At 710, singular value decomposition is applied to represent the words and passages as vectors in a high dimensional semantic space. At 712, the process generates (a) term vectors, (b) document vectors, and (c) diagonal matrix of singular names. The results are saved, at 714, into the semantic space.

Dynamic Theming

Dynamic theming can be performed upon any suitable set of data, including the results from performing topic analysis as described above. This allows the user to dynamically identify the central or pertinent idea of some or all of an item from within the set of data.

Figure 8:
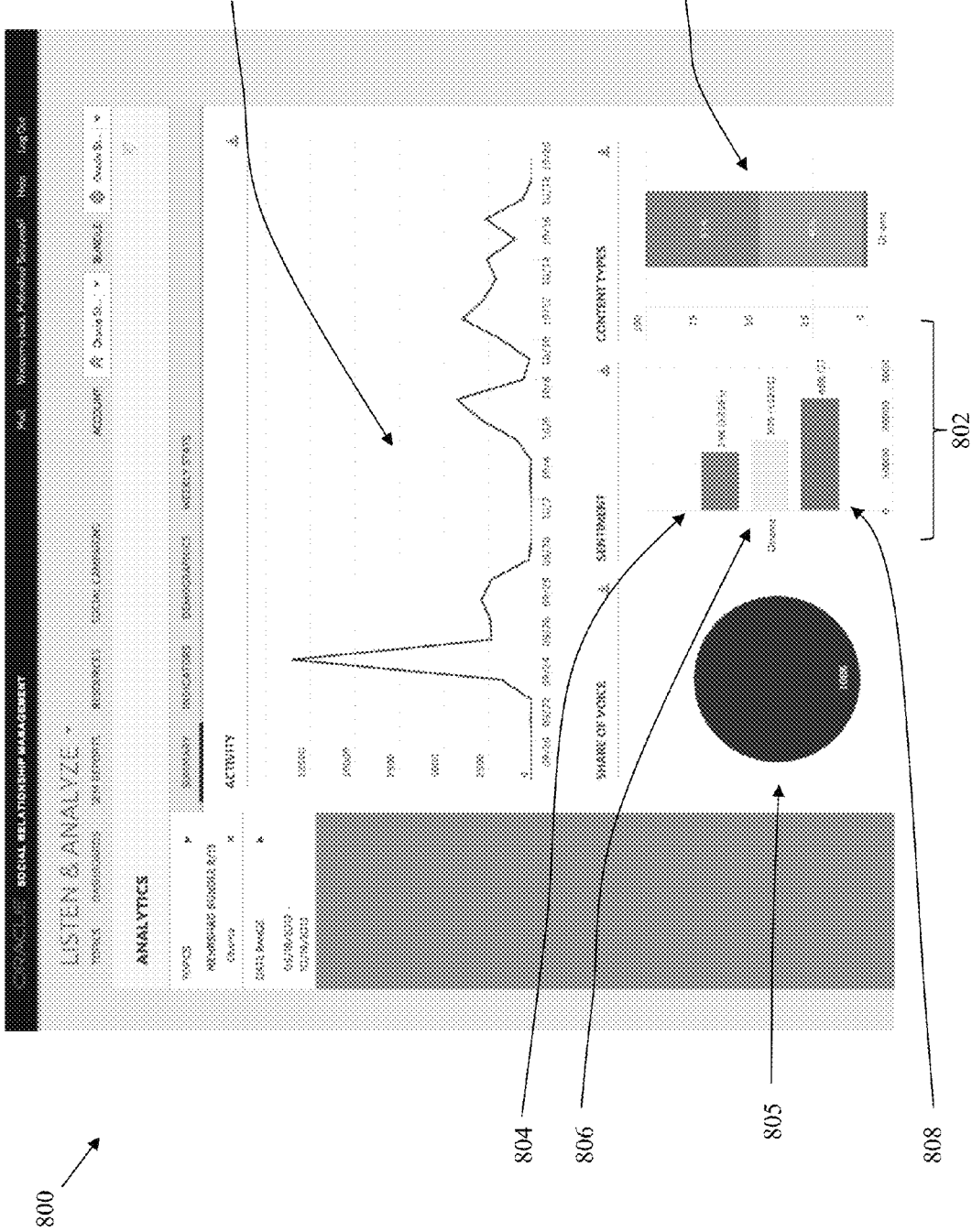
FIG. 8 illustrates an example dashboard interface for viewing the results of performing analysis upon data from social media sites for a given topic.

To explain, consider if the user is interested in performing dynamic theming to analyze topic analysis results that are presented in a dashboard interface. FIG. 8 illustrates an example dashboard interface for viewing the results of performing analysis upon data from social media sites for a given topic (e.g., using a social relationship management tool such as the SRM product available from Oracle Corporation of Redwood Shores, Calif.).

This example interface shows a dashboard 800 containing an interface portion 802 for visually displaying the sentiment analysis results for a topic of interest (e.g., the "Obama" topic). Within the interface portion 802, results are displayed that indicate the percentage/number of the analyzed content that expresses a positive sentiment (804), neutral sentiment (806), or negative sentiment (808). Interface portion 807 displays a chart of messaging activity for the topic over a designated period of time. Interface portion 803 provides a display that contains information about the content type for the analysis results. Interface portion 805 provides a pie chart giving visual indications of various percentages within the results set.

In conjunction with this type of dashboard to display analysis results, some embodiments of the present invention provide a dynamic theming mechanism for allowing the user to better understand the context of that analyzed content. This can, for example, provide the user with a better understanding of the underpinnings for the analysis.

In some embodiments of the invention, any of the interface portions within the dashboard 800 is selectable to perform dynamic theming upon the data associated with that interface portion. The user can drill down into specific dates or date ranges (interface portion 807), sentiments (interface portion 802), percentage parts of the overall analysis results (interface portion 805), and/or by content type (interface portion 803).

For example, assume that the user is interested in drilling down further into the set of content that underlies the "positive" sentiment for the topic of interest (e.g., by clicking on the interface elements within interface portion 804). In some embodiments of the invention, this causes a sampling to occur of the underlying data that is associated with this set of sentiments analysis results. The sampled data that pertains to the positive sentiment would then be analyzed to identify themes within that data.

Figure 9:
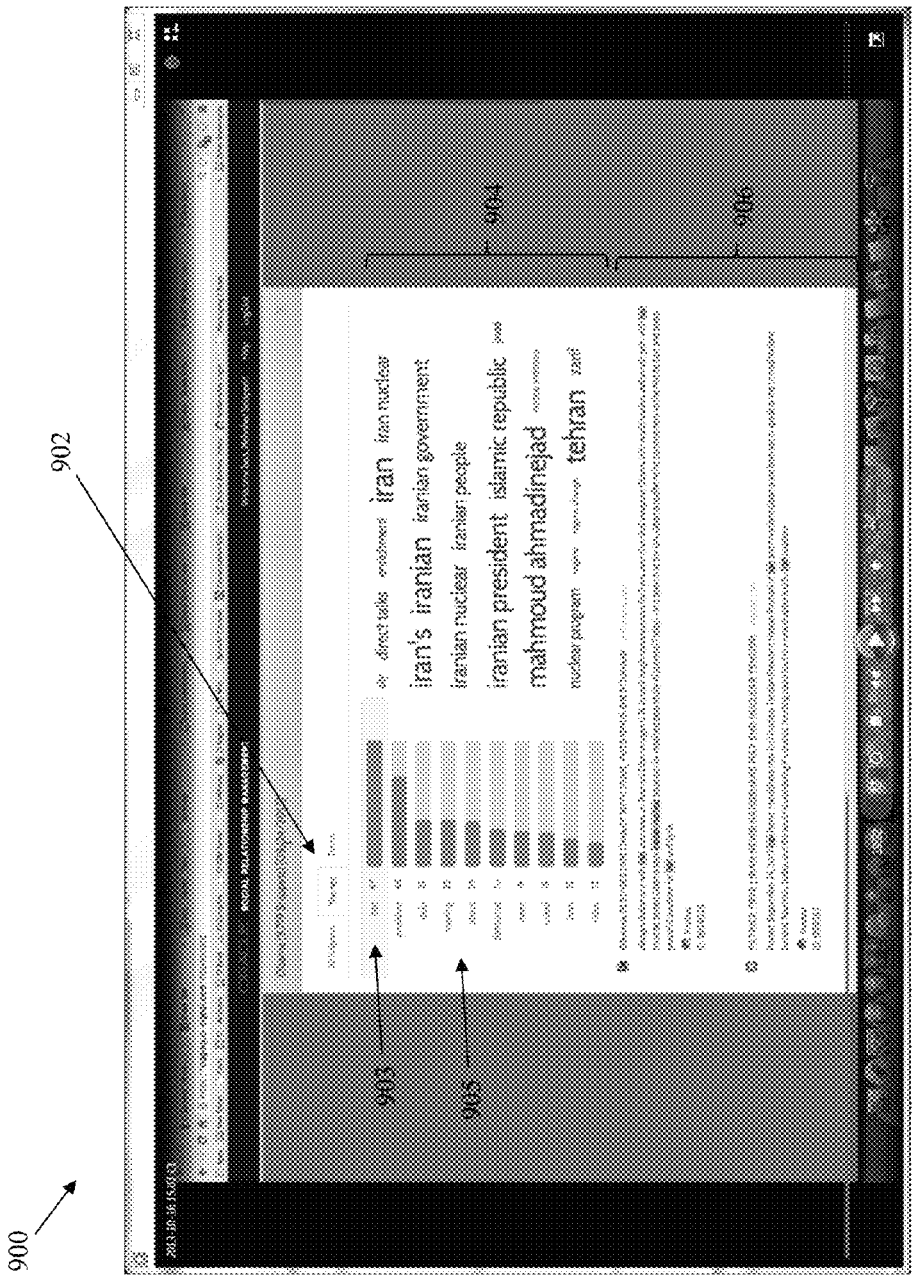
FIG. 9 illustrates an example interface that can be used to display the results of performing this dynamic theming analysis.

FIG. 9 illustrates an example interface 900 that can be used to display the results of performing this dynamic theming analysis. Interface 900 can be configured to include several distinct interface portions, specifically within the "Themes" tab 902 of interface 900.

Interface portion 905 provides a listing of the themes that are identified from within the sampled social data that pertain to selected sentiment. Each of the identified themes has a theme identifier, along with a numerical value identifying the number of messages/items that pertain to the theme. The listing of the themes can be presented as a sorted list, where the themes having the largest number of messages/items are placed at the top of the list.

The interface permits a user to select a theme to review additional information about that theme. For example, interface portion 903 shows a highlighted theme, where selection of this theme by the user (e.g., by having the user move a mouse interface over these theme) causes portion 904 to display additional content/information/terms from messages/items that correspond to that theme. Snippets can also be reviewed in interface portion 906. The user can review the displayed information to determine if that identified theme is of interest to the user.

Figure 10:
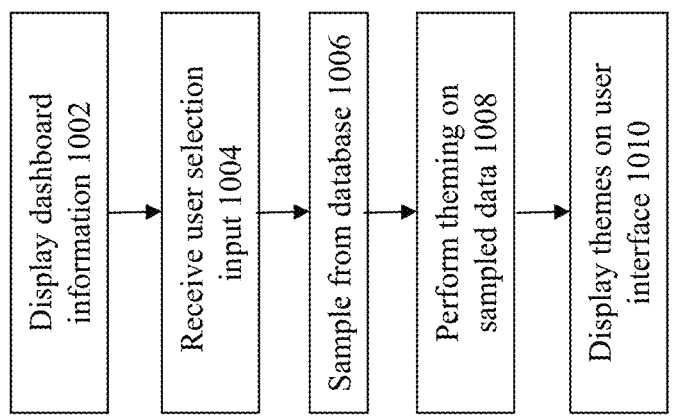
FIG. 10 shows a flowchart of an approach to perform dynamic theming according to some embodiments of the invention.

FIG. 10 shows a flowchart of an approach to perform dynamic theming according to some embodiments of the invention. At 1002, an interface is displayed to the user which contains items of information for which a user may wish to drill-down to identify themes in the underlying data. For example, a dashboard interface can be provided that includes analysis data from performing topic analysis on social media data. The dashboard may include information pertaining to sentiment analysis, activity levels, content type for the analysis results (e.g., split by gender), and visual indications of various percentages within the results set.

At 1004, the process may receive one or more inputs indicating that the user has selected a portion of the displayed data for further analysis. This may occur, for example, by having the user select one or more portions of the interface, e.g., by clicking on the appropriate portion of the interface with a mouse device.

At 1006, sampling is performed to acquire a sample set of data from the content database. The user selection provides at least part of the criteria that is used to perform the sampling. For example, if the user had indicated an interested in drilling down into the "positive sentiment" portion of the interface, then this aspect of "positive sentiment" provides a filtering criteria for performing a search/sample through the content database for the themes analysis.

Any suitable sampling size may be utilized, as appropriate for the specific application to which the invention may be applied. In some embodiments, a random sampling of approximately 1000 messages is obtained from the content database. In an alternate embodiment, sampling is not performed; instead, the entirety of the content is analyzed.

At 1008, theme analysis is performed to identify themes within the sampled data. Any number of themes can be identified according to this process. In some embodiments, a limited number of the top n themes are identified from the sampled data, where ranking/sorting is performed based at least in part upon the quantity of the sampled content corresponds to each identified theme. In one specific embodiment, the top 20 themes are identified from the data.

Thereafter, at 1010, the identified themes are displayed to the user. Any suitable interface can be utilized to display the themes to the user. For example, the interface may include a sorted listing of the themes that are identified from within the sampled social data, including a numerical value identifying the number of messages/items that pertain to the identified theme. A portion of the interface may also include additional content/information/terms from messages/items that correspond to a selected or highlighted theme. Snippets for the themes can also be reviewed in the interface.

Figure 11:
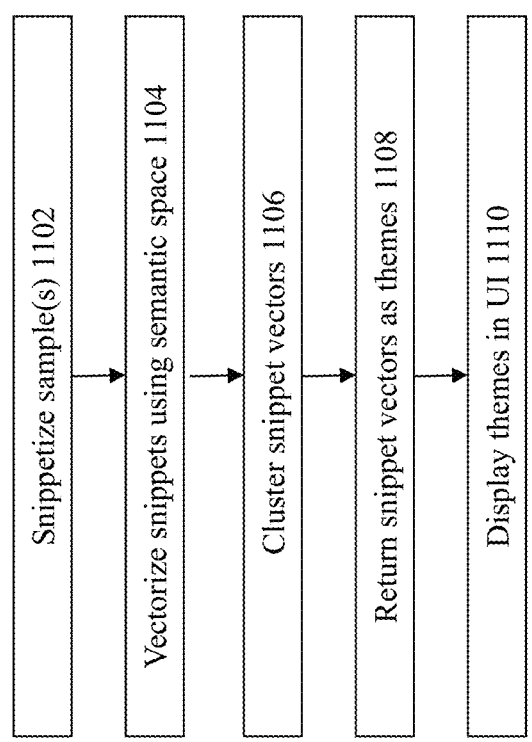
FIG. 11 shows a flowchart of an approach to perform theme identification from the sampled data.

FIG. 11 shows a flowchart of an approach to perform theme identification from the sampled data. As noted above, a request had been made for a random set of messages that correspond to the criteria of interest. For example, a sample size of 500-1000 can be randomly retrieved in some embodiments to perform the sampling from the content database. The data may be extracted. For example, from the sample corpus 438 to obtain a random selection of messages using the user's search criteria. It is noted that while the currently described embodiment describes analysis of social data, the inventive concepts are applicable to analysis of other types of content as well.

At 1102, the random sample of messages is snippetized into snippets. As noted above, the snippet may not be the entirety of the message content. Instead, the snippet may only contain a given number of words on either side of the occurrence of the word/topic of interest within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries to adjust the cut-off point for a snippet. In an alternate embodiment, the entirety of the message content is used instead of snippets.

At 1104, the snippets that correspond to the random sample of messages are vectorized using the semantic space 436. The vectorization is performed for all of the words within the snippets, where a vector is obtained for each word in the snippet. The vectors for a given snippet are averaged together to obtain a single, overall vector for the snippet. This provides a mathematical value for the context/meaning of that snippet.

At 1106, the snippets are clustered together, and vector comparisons are performed so that snippets having similar vectors are clustered together. Clustering may be performed, for example, by using the KMeans++ approach to clustering.

At 1108, the clustered snippets are returned as themes, where a given cluster of vectors corresponds to a single theme. Thereafter, at 1110, the themes are displayed to the user in a user interface.

Therefore, what has been described is an improved system, method, and computer program product for allowing an entity to access social media data, and to perform dynamic theme analysis upon that data.

System Architecture Overview

Figure 12:
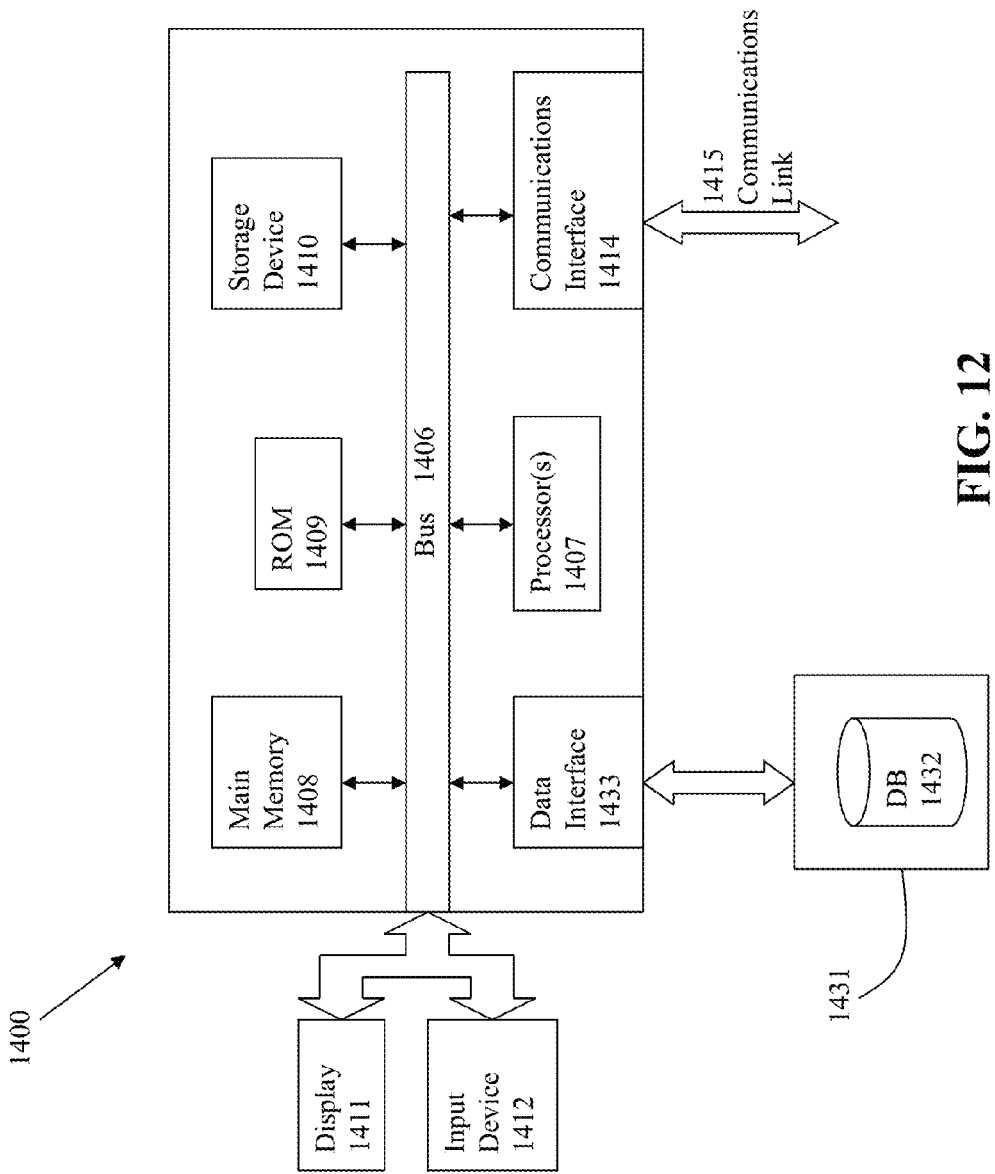
FIG. 12 depicts a computerized system on which an embodiment of the invention can be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed in a database 1432 on a storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
generating a first user interface that displays analysis results identified from within one or more social media sources, the first user interface comprising one or more selectable user interface components corresponding to different subsets of sentiment analysis results, the one or more selectable user interface components being selected from the first user interface to perform analysis on a subset of the sentiment analysis results, results from performing the analysis on the subset of the sentiment analysis results being displayed within a second user interface,
generating the second user interface that displays the analysis results performed on one or more social media data sources pertaining to a selected subset of sentiment analysis results from the first user interface, the second user interface comprising:
(a) a first interface portion comprising a list of one or more analysis results derived from a selection of the selected subset of the sentiment analysis results from among the different subsets of sentiment analysis results in the first user interface, an individual analysis result from among the one or more analysis results being selectable to display a set of terms associated with a selected individual analysis result in a second interface portion,
(b) the second interface portion comprising the set of terms, the set of terms associated with the selected individual analysis result from the first interface portion, and
(c) a third interface portion comprising snippets corresponding to the social media data sources associated with the selected individual analysis result from the first interface portion;
receiving the selection of the one or more selectable user interface components in the first user interface to perform the analysis on the subset of the sentiment analysis results;
performing a search of content from the social media sources pertaining to the selected subset of the sentiment analysis results corresponding to a selected selectable user interface component to generate the list of the one or more analysis results;
performing the analysis to identify two or more themes from the sentiment analysis results of the search of the content from the social media sources by:
receiving a random sample of messages from the content;
generating snippets obtained from the search by analyzing the random sample of messages to identify the two or more themes, wherein an individual theme comprises a set of the snippets having vector values that are clustered together,
vectorizing the snippets by applying a singular value decomposition (SVD) to represent the snippets as vectors,
clustering the snippets by performing vector comparisons between the snippets, and
generating the two or more themes based at least in part on clustered snippets; and
displaying the results of the analysis in a first interface portion of the second user interface, a selection of the individual analysis result from among the results of the analysis in the first interface portion of the second user interface generating:
(a) the set of terms associated with the selected individual analysis for display in the second interface portion of the second user interface, and
(b) the snippets corresponding to the social media data sources associated with the selected individual analysis result for display in the first interface portion of the second user interface.

2. The method of claim 1, wherein the user interface comprises a dashboard that displays results from performing semantic analysis for a topic.

3. The method of claim 2, wherein the dashboard displays at least one of sentiment analysis, messaging activity over a time period, and content type.

4. The method of claim 3, in which the portion of the analysis results that is selected for the theme analysis corresponds to at least one of the sentiment analysis, the messaging activity over the time period, or the content type.

5. The method of claim 3, in which a filter criteria is created for the search, where the filter criteria corresponds to the portion of the analysis results that is selected for theme analysis.

6. The method of claim 1, wherein the first user interface further comprises a sorted list comprising the one or more analysis results such that an analysis result corresponding to the largest number of items is placed at a top of the sorted list, the analysis result comprising a numerical value identifying a number of items that pertain to a search term, the individual analysis result that is selected being visually differentiated from the one or more analysis results.

7. The method of claim 6, in which the user interface provides a listing of the two or more themes, along with content associated with a selected theme.

8. The method of claim 1, wherein the content for a selected theme comprises one or more terms or snippets associated with the theme.

9. The method of claim 1, wherein the snippets comprise a set of terms on either side of an occurrence of a word of interest within the content.

10. The method of claim 1, wherein at least some of the snippets comprise a sentence or paragraph boundary.

11. The method of claim 1, wherein a theme from the two or more themes corresponds to a central or pertinent idea of some or all of a content item.

12. A computer readable medium having stored thereon a sequence of instructions which, when executed by a processor causes the processor to execute a method comprising:
   generating a dashboard user interface that displays analysis results identified from within one or more social media sources, the dashboard user interface comprising one or more selectable user interface components corresponding to different subsets of sentiment analysis results, the one or more selectable user interface components being selected from the dashboard user interface to perform analysis on a subset of the sentiment analysis results, results from performing the analysis on the subset of the sentiment analysis results being displayed within a results user interface,
   generating the results user interface that displays the analysis results performed on one or more social media data sources pertaining to a selected subset of sentiment analysis results from the dashboard user interface, the results user interface comprising:
      (d) a first interface portion comprising a list of one or more analysis results derived from a selection of the selected subset of the sentiment analysis results from among the different subsets of sentiment analysis results in the dashboard user interface, an individual analysis result from among the one or more analysis results being selectable to display a set of terms associated with a selected individual analysis result in a second interface portion,
      (e) the second interface portion comprising the set of terms, the set of terms associated with the selected individual analysis result from the first interface portion, and
      (f) a third interface portion comprising snippets corresponding to the social media data sources associated with the selected individual analysis result from the first interface portion;
   receiving the selection of the one or more selectable user interface components in the dashboard user interface to perform the analysis on the subset of the sentiment analysis results;
   performing a search of content from the social media sources pertaining to the selected subset of the sentiment analysis results corresponding to a selected selectable user interface component to generate the list of the one or more analysis results;
   performing the analysis to identify two or more themes from the sentiment analysis results of the search of the content from the social media sources by:
      receiving a random sample of messages from the content;
      generating snippets obtained from the search by analyzing the random sample of messages to identify the two or more themes, wherein an individual theme comprises a set of the snippets having vector values that are clustered together,
      vectorizing the snippets by applying a singular value decomposition (SVD) to represent the snippets as vectors,
      clustering the snippets by performing vector comparisons between the snippets, and
      generating the two or more themes based at least in part on clustered snippets;
   and
   displaying the results of the analysis in a first interface portion of the results user interface, a selection of the individual analysis result from among the results of the analysis in the first interface portion of the results user interface generating:
      (c) the set of terms associated with the selected individual analysis for display in the second interface portion of the results user interface, and
      (d) the snippets corresponding to the social media data sources associated with the selected individual analysis result for display in the first interface portion of the results user interface.

13. The computer readable medium of claim 12, wherein the user interface comprises a dashboard that displays results from performing semantic analysis for a topic.

14. The computer readable medium of claim 13, wherein the dashboard displays at least one of sentiment analysis, messaging activity over a time period, and content type.

15. The computer readable medium of claim 14, in which the portion of the analysis results that is selected for the theme analysis corresponds to at least one of the sentiment analysis, the messaging activity over a time period, or the content type.

16. The computer readable medium of claim 14, in which a filter criteria is created for the search, where the filter criteria corresponds to the portion of the analysis results that is selected for theme analysis.

17. The computer readable medium of claim 12, in which the user interface displays the two or more themes in the user interface.

18. The computer readable medium of claim 17, in which the user interface provides a listing of the two or more themes, along with content associated with a selected theme.

19. The computer readable medium of claim 12, wherein the content for a selected theme comprises one or more terms or snippets associated with the theme.

20. The computer readable medium of claim 12, wherein the snippets comprise a set of terms on either side of an occurrence of a word of interest within the content.

21. The computer readable medium of claim 12, wherein at least some of the snippets comprise a sentence or paragraph boundary.

22. The computer readable medium of claim 12, wherein a theme from the two or more themes corresponds to a central or pertinent idea of some or all of a content item.

23. A system, comprising:
   a processor;
   a memory comprising computer code executed using the processor, in which a computer code implements:

generating a dashboard user interface that displays analysis results identified from within one or more social media sources, the dashboard user interface comprising one or more selectable user interface components corresponding to different subsets of sentiment analysis results, the one or more selectable user interface components being selected from the dashboard user interface to perform analysis on a subset of the sentiment analysis results, results from performing the analysis on the subset of the sentiment analysis results being displayed within a results user interface, generating the results user interface that displays the analysis results performed on one or more social media data sources pertaining to a selected subset of sentiment analysis results from the dashboard user interface, the results user interface comprising:

(a) a first interface portion comprising a list of one or more analysis results derived from a selection of the selected subset of the sentiment analysis results from among the different subsets of sentiment analysis results in the dashboard user interface, an individual analysis result from among the one or more analysis results being selectable to display a set of terms associated with a selected individual analysis result in a second interface portion, (b) the second interface portion comprising the set of terms, the set of terms associated with the selected individual analysis result from the first interface portion, and (c) a third interface portion comprising snippets corresponding to the social media data sources associated with the selected individual analysis result from the first interface portion;

receiving the selection of the one or more selectable user interface components in the first user interface to perform the analysis on the subset of the sentiment analysis results;

performing a search of content from the social media sources pertaining to the selected subset of the sentiment analysis results corresponding to a selected selectable user interface component to generate the list of the one or more analysis results; and performing the analysis to identify two or more themes from the sentiment analysis results of the search of the content from the social media sources by:

receiving a random sample of messages from the content;

generating snippets obtained from the search by analyzing the random sample of messages to identify the two or more themes, wherein an individual theme comprises a set of the snippets having vector values that are clustered together, vectorizing the snippets by applying a singular value decomposition (SVD) to represent the snippets as vectors, clustering the snippets by performing vector comparisons between the snippets, and generating the two or more themes based at least in part on clustered snippets; and displaying the results of the analysis in a first interface portion of the results user interface, a selection of the individual analysis result from among the results of the analysis in the first interface portion of the results user interface generating:

(a) the set of terms associated with the selected individual analysis for display in the second interface portion of the results user interface, and (b) the snippets corresponding to the social media data sources associated with the selected individual analysis result for display in the first interface portion of the results user interface.

24. The system of claim 23, wherein the user interface comprises a dashboard that displays results from performing semantic analysis for a topic.

25. The system of claim 24, wherein the dashboard displays at least one of sentiment analysis, messaging activity over a time period, and content type.

26. The system of claim 25, in which the portion of the analysis results that is selected for the theme analysis corresponds to at least one of the sentiment analysis, the messaging activity over a time period, or the content type.

27. The system of claim 25, in which a filter criteria is created for the search, where the filter criteria corresponds to the portion of the analysis results that is selected for theme analysis.

28. The system of claim 23, further comprising the two or more themes displayed in the user interface.

29. The system of claim 28, in which the user interface provides a listing of the one or more themes, along with content associated with a selected theme.

30. The system of claim 23, wherein the content for a selected theme comprises one or more terms or snippets associated with the theme.

31. The system of claim 23, wherein the snippets comprise a set of terms on either side of an occurrence of a word of interest within the content.

32. The system of claim 23, wherein at least some of the snippets comprise a sentence or paragraph boundary.

33. The system of claim 23, wherein a theme from the two or more themes corresponds to a central or pertinent idea of some or all of a content item.

* * * * *

UNITED STATES PATENT AND TRADEMARK OFFICE
CERTIFICATE OF CORRECTION

PATENT NO. : 9,996,529 B2
APPLICATION NO. : 14/555075
DATED : June 12, 2018
INVENTOR(S) : McCandless et al.

Page 1 of 1

It is certified that error appears in the above-identified patent and that said Letters Patent is hereby corrected as shown below:

In the Specification

In Column 13, Line 25, delete "PTSN," and insert -- PSTN, --, therefor.

Signed and Sealed this
Twenty-ninth Day of January, 2019

Andrei Iancu
*Director of the United States Patent and Trademark Office*